(12) United States Patent
Okamoto

(10) Patent No.: US 11,267,132 B2
(45) Date of Patent: Mar. 8, 2022

(54) ROBOT SYSTEM

(71) Applicant: FANUC CORPORATION, Yamanashi (JP)

(72) Inventor: Takahiro Okamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 120 days.

(21) Appl. No.: 16/751,222

(22) Filed: Jan. 24, 2020

(65) Prior Publication Data

US 2020/0238536 A1 Jul. 30, 2020

(30) Foreign Application Priority Data

Jan. 29, 2019 (JP) .............................. JP2019-013403

(51) Int. Cl.
*B25J 13/08* (2006.01)
*B25J 9/16* (2006.01)

(52) U.S. Cl.
CPC ............. *B25J 13/08* (2013.01); *B25J 9/1664* (2013.01)

(58) Field of Classification Search
CPC .......... B25J 13/08; B25J 9/1664; B25J 13/00; G06F 3/0346; G06F 3/013; G06F 3/01; G05B 2219/40131; G05B 19/409; G05B 19/42; G02B 2027/0187; G02B 27/017
USPC ................................................ 700/245–264
See application file for complete search history.

(56) References Cited

U.S. PATENT DOCUMENTS

| | | | | |
|---|---|---|---|---|
| 5,649,061 | A * | 7/1997 | Smyth | A61B 5/378 706/16 |
| 6,120,461 | A * | 9/2000 | Smyth | A61B 3/113 600/558 |
| 8,824,779 | B1 * | 9/2014 | Smyth | G06T 7/593 382/154 |
| 9,552,060 | B2 * | 1/2017 | Ambrus | G06F 3/017 |
| 10,712,566 | B2 * | 7/2020 | Touma | G06F 3/012 |
| 10,956,739 | B2 * | 3/2021 | Thomasson | B25J 9/1671 |
| 2004/0104935 | A1 * | 6/2004 | Williamson | G06T 15/20 715/757 |
| 2016/0269631 | A1 * | 9/2016 | Jiang | G09B 5/02 |

(Continued)

FOREIGN PATENT DOCUMENTS

| | | |
|---|---|---|
| JP | 2016107379 A | 6/2016 |
| JP | 2017102242 A | 6/2017 |

(Continued)

*Primary Examiner* — Jaime Figueroa
(74) *Attorney, Agent, or Firm* — Hauptman Ham, LLP

(57) ABSTRACT

A robot system includes a robot, a robot controller, a video acquisition device configured to acquire a real video of a work space, and a head-mounted type video display device provided with a visual line tracking section configured to acquire visual line information. A robot controller includes an information storage section configured to store information used for controlling the robot while associating the information with a type of an object, a gaze target identification section configured to identify, in the video, a gaze target viewed by a wearer based on the visual line information, and a display processing section configured to cause the video display device to display the information associated with the object corresponding to the identified gaze target, side by side with the gaze target in the form of one image through which the wearer can visually grasp, select, or set contents of the information.

15 Claims, 16 Drawing Sheets

(56) References Cited

U.S. PATENT DOCUMENTS

2017/0206710 A1*  7/2017  Touma ................. G06F 3/0481
2017/0372139 A1* 12/2017  Thomasson .......... G02B 27/017
2020/0133002 A1*  4/2020  Yamazaki ............. B25J 9/1689

FOREIGN PATENT DOCUMENTS

| JP | 2017104944 A | 6/2017 |
| JP | 2017538218 A | 12/2017 |
| JP | 2018153874 A | 10/2018 |
| JP | 2018176342 A | 11/2018 |
| JP | 202069538 A | 5/2020 |

* cited by examiner

ROBOT SYSTEM

RELATED APPLICATIONS

The present application claims priority of Japanese Application Number 2019-013403 filed Jan. 29, 2019, the disclosure of which is hereby incorporated by reference herein in its entirety.

BACKGROUND OF THE INVENTION

1. Field of the Invention

The present invention relates to a robot system.

2. Description of the Related Art

Recently, Augmented Reality (AR) technology is expected to be applied to industrial robots. For example, Japanese Unexamined Patent Application Publication No. 2016-107379A describes a robot system in which an operation guide indicating a direction of a jog operation at a tool tip point is superimposed on an image of a robot in a real environment displayed on a head-mounted display equipped with an imaging device. Japanese Unexamined Patent Application Publication (Translation of PCT Application) No. 2017-538218A describes a system in which a user operates an application launcher superimposed on a real environment video by using a visual line as a mouse cursor while recognizing a gaze target of the user by a visual line tracking device provided in a head-mounted display.

SUMMARY OF THE INVENTION

In general, in order for a user to access desired information through a user interface screen displayed on a display section of a teach pendant or the like in a robot system, it is necessary to perform operation for finding desired information by sequentially selecting hierarchically presented selection menus. There is a need for a robot system having a configuration that allows a user to access desired information more efficiently.

One aspect of the present disclosure is a robot system which includes a robot, a robot controller configured to control the robot, a video acquisition device configured to acquire a real video of a work space including the robot and the robot controller, and a head-mounted type video display device provided with a visual line tracking section configured to acquire visual line information of a wearer, where the robot controller includes an information storage section configured to store information used for controlling the robot while associating the information with a type of an object existing in the work space, a gaze target identification section configured to identify, in the video, a gaze target viewed by a wearer of the video display device in the work space, based on the visual line information, and a display processing section configured to cause the video display device to display the information associated with the object corresponding to the identified gaze target, side by side with the gaze target in the form of one image through which the wearer can visually grasp, select, or set contents of the information.

BRIEF DESCRIPTION OF THE DRAWINGS

The objects, features and advantages of the present invention will become more apparent from the description of the following embodiments in connection with the accompanying drawings, wherein: in the attached drawings.

DETAILED DESCRIPTION

Figure 1:
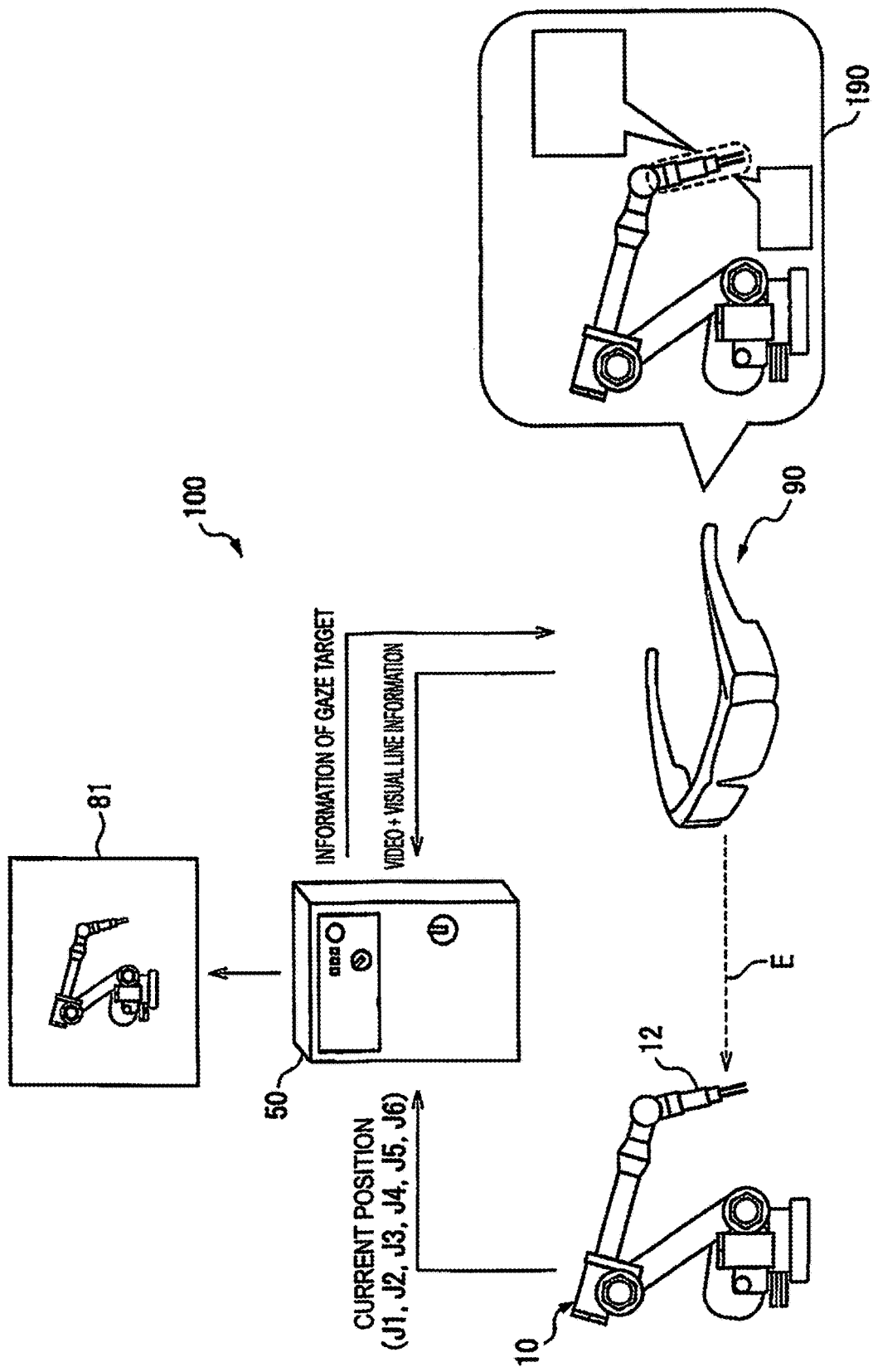
FIG. 1 is a diagram illustrating a configuration of a robot system according to an embodiment of the present disclosure.

Embodiments of the present disclosure will be described below with reference to the accompanying drawings. Throughout the drawings, corresponding components are denoted by common reference numerals. For ease of understanding, these drawings are scaled as appropriate. The embodiments illustrated in the drawings are examples for implementing the present invention, and the present invention is not limited to the embodiments illustrated in the drawings.

Figure 2:
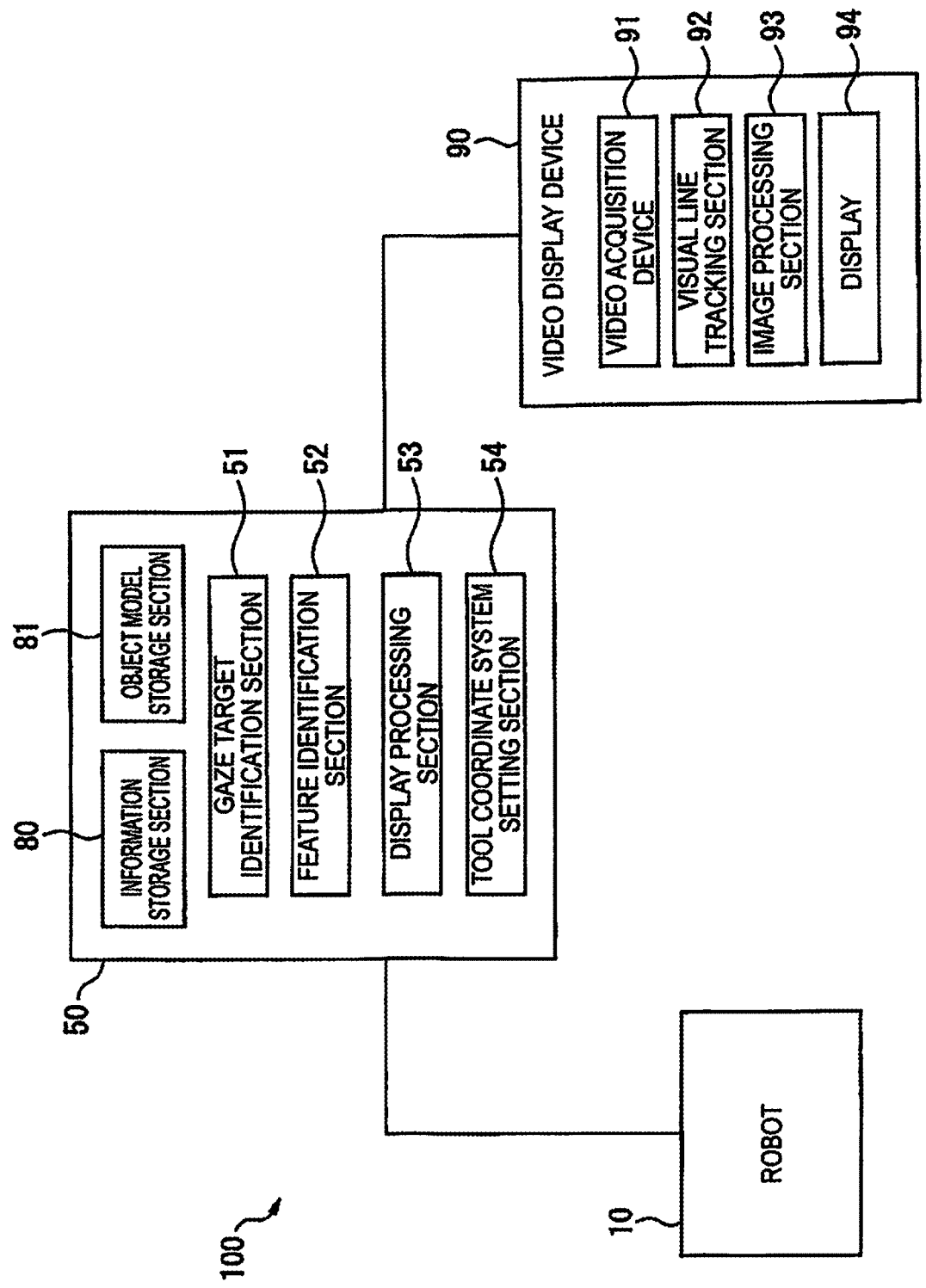
FIG. 2 is a functional block diagram of the robot system.

FIG. 1 is a diagram illustrating a configuration of a robot system 100 according to an embodiment of the present disclosure. FIG. 2 is a functional block diagram of the robot system 100. As illustrated in FIG. 1 to FIG. 2, the robot system 100 includes a robot 10, a robot controller 50 configured to control the robot 10, a video acquisition device 91 configured to acquire a real video of a work space including the robot 10 and the robot controller 50, and a head-mounted type video display device 90 provided with a visual line tracking section 92 configured to acquire visual line information of a wearer. The robot controller 50 includes an information storage section 80 configured to store information used for controlling the robot 10 while associating the information with a type of an object (robot 10, robot controller 50, peripheral devices, etc.) existing in a work space, a gaze target identification section 51 configured to identify, in the video, a gaze target viewed by a wearer of the video display device 90 in the work space, based on the visual line information, and a display processing section 53 configured to cause the video display device 90 to display the information associated with the object corresponding to the identified gaze target, side by side with the gaze target in the form of one image through which the wearer can visually grasp, select, or set contents of the information. In the present embodiment, the video acquisition device 91 is integrated with the video display device 90, but this is an example, and the video acquisition device 91 may be provided separately from the video display device 90.

The robot 10 is a vertical articulated robot in the present embodiment, and a tool 12 is mounted on the tip portion of the arm. The robot 10 may be another type of robot. For example, when the robot 10 is a 6 axis robot, the robot controller 50 acquires the position of each axis (J1 to J6) from the robot 10 as information representing the current position of the robot 10. The robot controller 50 may have a configuration as a general computer including a CPU, a ROM, a RAM, a storage device, etc.

The video display device 90 includes a display 94 disposed in front of both eyes of the wearer, and displays the video acquired by the video acquisition device 91 on the display 94. As the visual line tracking section 92, a device having a general configuration known in the art for measuring the visual line can be used. As an example, the visual line tracking section 92 acquires the positional relationship between the corneal reflex (reference point) and the pupil (moving point) of both eyes of the wearer by an infrared LED and an infrared camera which are disposed at positions in front of both eyes of the wearer of the video display device 90, and thereby obtains the visual line direction (indicated by a dashed arrow E in FIG. 1). The video acquired by the video acquisition device 91 and the visual line information acquired by the visual line tracking section 92 are transmitted to the robot controller 50. An image processing section 93 executes video processing in which information relating to a gaze target provided from the robot controller 50 is superimposed and displayed on the video from the video acquisition device 91 so as to be disposed side by side with the gaze target.

In the present embodiment, the video acquisition device 91 and the visual line tracking section 92 are integrally provided in the video display device 90, and their positions are fixed to the head of the wearer. Therefore, by using the visual line information (eye direction) measured by the visual line tracking section 92, it is possible to identify the gaze target of the wearer in the video. The robot controller 50 includes an object model storage section 81 configured to store object models which model their respective objects (robot 10, robot controller 50, and peripheral device, etc.) in the work space. As an example, the gaze target identification section 51 may identify the position of the object in the video and the portion of a gaze target on the object by image recognition processing using the object model stored in the object model storage section 81.

The robot controller 50 further includes a feature identification section 52 and a tool coordinate system setting section 54. In order to enable the video display device 90 to display information specific to each feature portion predetermined for each object, the information storage section 80 stores the information specific to each feature portion while associating the information with each feature portion predetermined for each object. Table 1 below is an example of the information stored in the information storage section 80. As shown in Table 1 below, the predetermined feature portion for the robot 10 is, for example, a tool and a joint portion, and the predetermined feature portion for the robot controller 50 is, for example, a power switch and a mode selection switch. The information specific to each feature portion includes internal information and setting information of the feature portion.

TABLE 1

| Object | Feature portion | Information |
| --- | --- | --- |
| Robot | Tool | Tool coordinate system: already-set <br> (X, Y, Z) = (0 mm, 0 mm, 100 mm) <br> (W, P, R) = (180 deg, 0 deg, 0 deg) <br> Load setting: not set |
| | Joint portion | Current position: <br> J1 = 10°, J2 = 45°, J3 = 45°, <br> J4 = 10°, J5 = −70°, J6 = 10° <br> Movable range of joint: <br> J1 = ±180°, J2 = ±140°, J3 = ±140° <br> J4 = ±180°, J5 = ±100°, J6 = ±180° |
| Robot controller | Power SW | On |
| | Mode selection SW | Auto mode |
| | Arbitrary point | Name of operation program, Execution position |

The feature identification section 52 identifies a feature portion that the wearer is gazing at by using the object model and the video and the visual line information. The feature identification section 52 uses, for example, an object model of the robot 10 and a current position of each axis of the robot 10, causes the object model to assume a posture corresponding to the current posture of the robot 10, identifies a position of the robot 10 in the video by pattern matching, and further identifies which of a plurality of feature portions previously set for the robot 10 is a target of the wearer's gaze.

The display processing section 53 acquires the specific information of the feature portion identified by the feature identification section 52 from the information storage section 80, and supplies the acquired information to the video display device 90 so as to image and display the information on the video displayed on the display 94 in a superimposed manner. In FIG. 1, a reference numeral 190 denotes an example of a screen displayed on the display 94 of the video display device 90.

Figure 3:
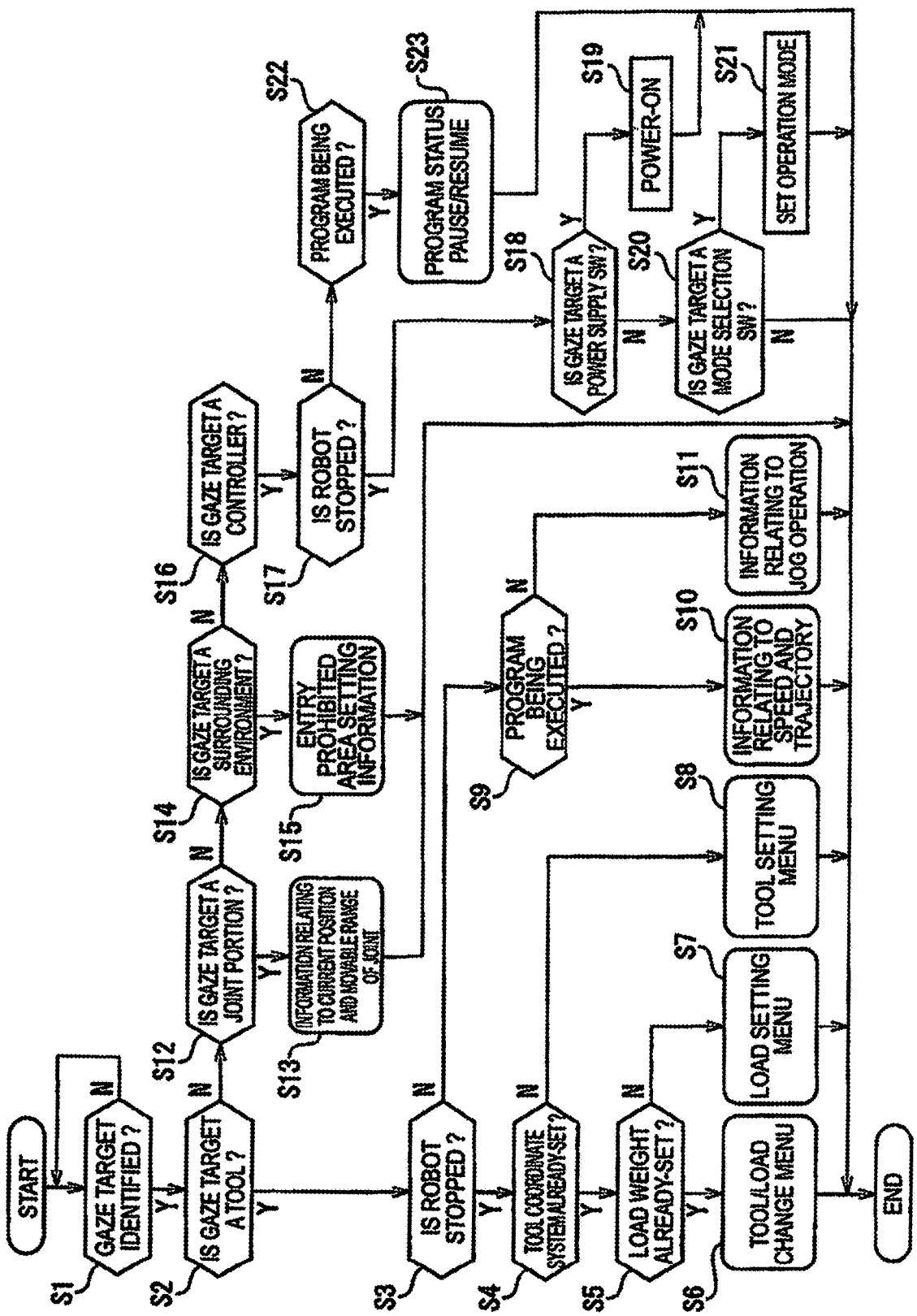
FIG. 3 is a flowchart illustrating information display processing.

FIG. 3 is a flowchart illustrating a process of displaying information relating to a gaze target on the video display device 90 in the form of one image through which the wearer can visually grasp, select or set the contents (hereinafter referred to as information display processing). The information display processing of FIG. 3 is executed under control of the CPU of the robot controller 50. Specifically, the display processing section 53 displays information relating to the gaze target (feature portion) while disposing the information side by side with the gaze target in the video by using the results of identifying the gaze target (feature portion) by the gaze target identification section 51 and the feature identification section 52. The user wears the video display device 90, performs a predetermined operation on the robot controller 50, and activates the information display processing. First, it is determined whether or not the gaze target is identified by the gaze target identification section 51 and the feature identification section 52 (step S1). When the gaze target is not identified, the process waits until the gaze target is identified (step S1: NO). When the gaze target is identified (S1: YES), it is determined whether or not the gaze target is the tool 12 of the robot 10 (step S2).

When it is determined that the gaze point A according to the visual line direction E of the wearer is on the tool 12 and the gaze target is the tool 12 of the robot 10 (S2: YES), the display processing section 53 causes the video display device 90 to display an image which allows the wearer to visually perform at least one of grasping the setting state of the tool coordinate system, new setting or changing setting of the tool coordinate system, grasping of the setting state of the load, and new setting or changing of the load, depending on whether or not the tool coordinate system of the tool 12 is already-set and whether or not the load corresponding to the tool 12 is already-set (steps S6 to S8).

Figure 4:
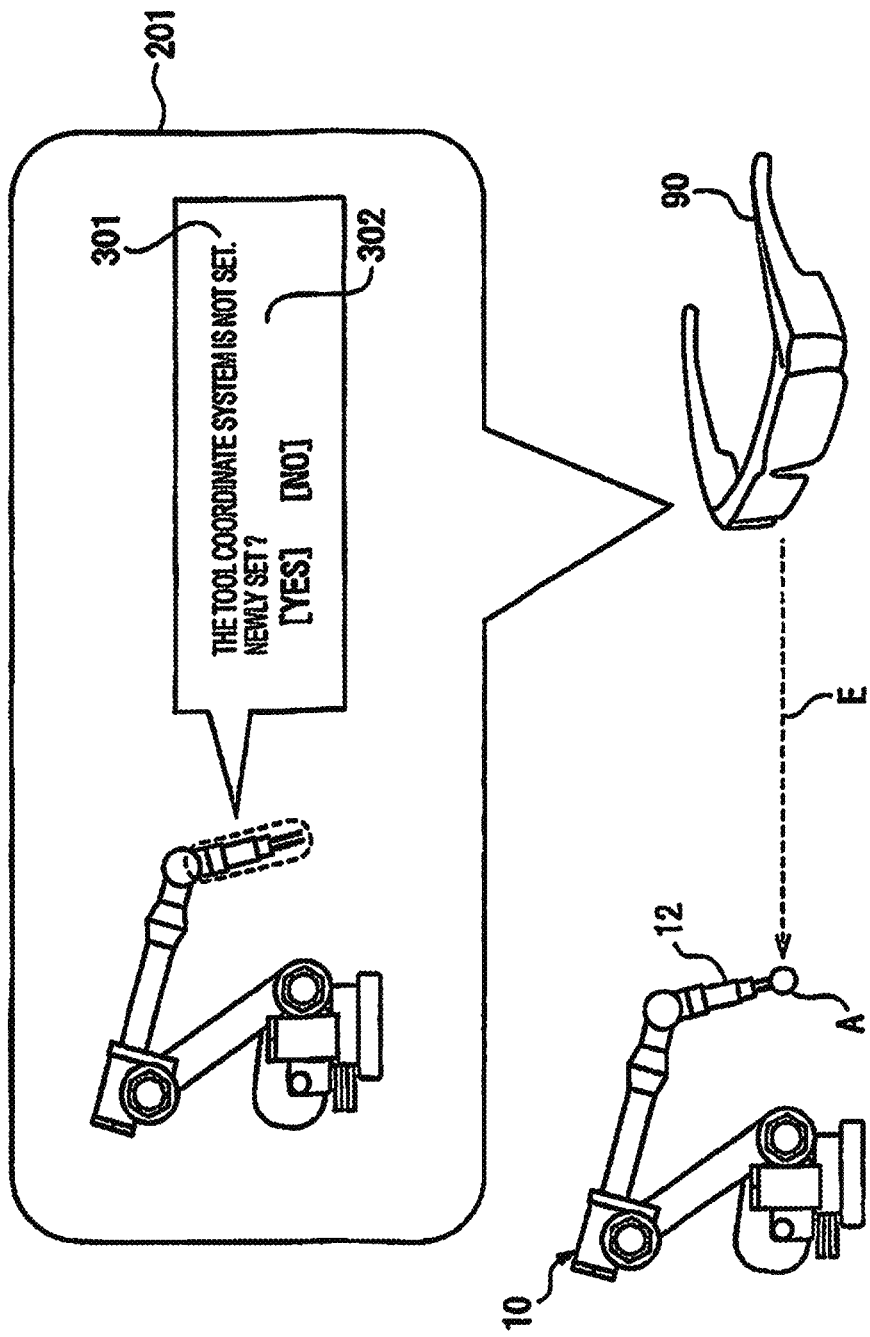
FIG. 4 is an example of a display screen in which a selection menu for selecting whether or not to newly set a tool coordinate system is superimposed on a video image.

Specifically, when the wearer watches the tool 12 (S2: YES), the robot 10 is stopped (S3: YES), and the tool coordinate system is not set (S4: NO), the display processing section 53, as illustrated in FIG. 4, superimposes and displays a message 301 indicating that the tool coordinate system is not set and a selection menu 302 for selecting whether or not to newly set the tool coordinate system on the video on the display 94 (Step S8). In FIG. 4, a reference numeral 201 denotes a display screen on the display 94 in which the message 301 and the selection menu 302 are superimposed on a video including the robot 10.

Figure 5:
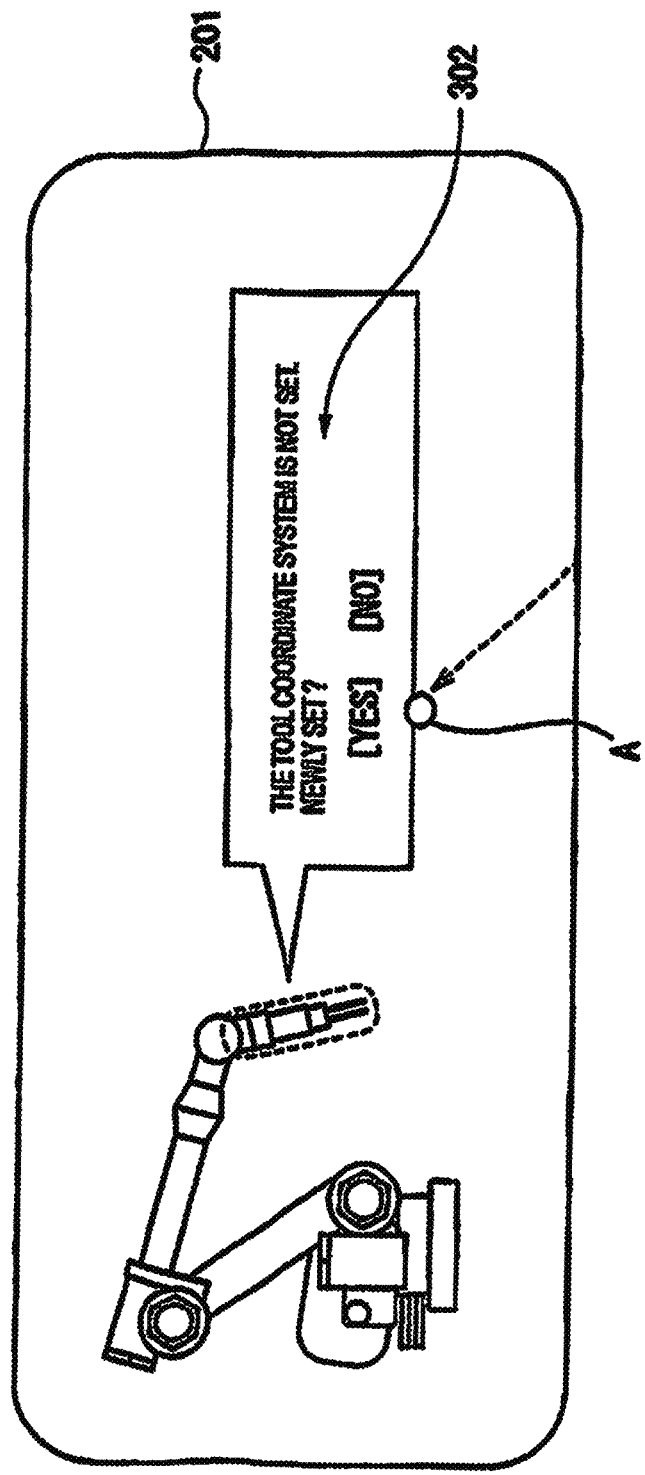
FIG. 5 is a diagram illustrating a state in which a selection menu is selected and operated by a visual line.

The wearer can select the selection menu 302 by the visual line on the display screen 201 (FIG. 5). For example, when the gaze point A of the wearer stays near "YES" on the selection menu 302 for several seconds, the robot controller 50 can determine that the wearer has selected "YES". The tool coordinate system setting process when the wearer selects "YES" will be described later.

Figure 6:
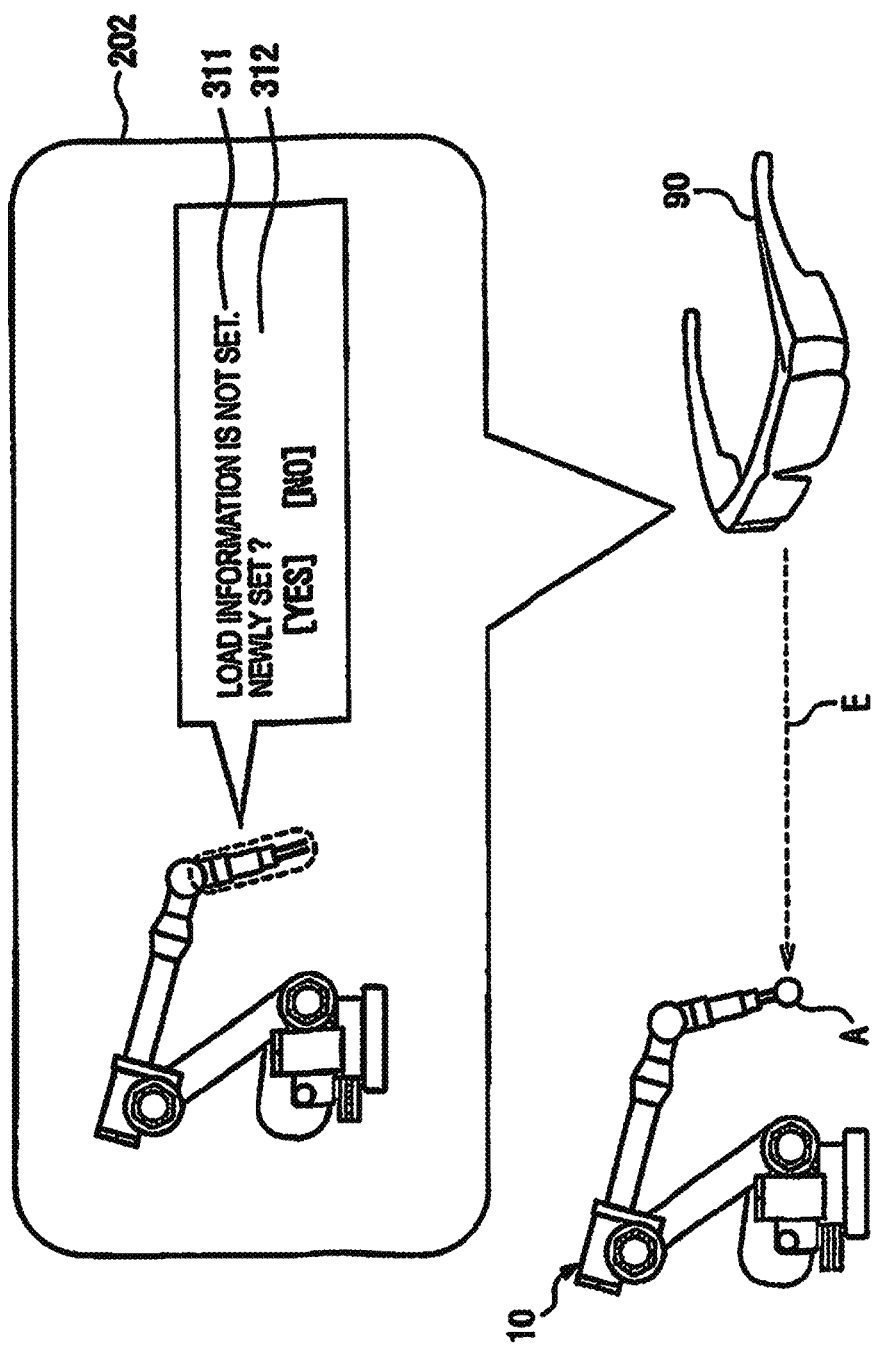
FIG. 6 is an example of a display screen in which contents relating to the load information are superimposed on the display screen.

When the tool coordinate system is already-set (S4: YES) and the load is not set (S5: NO), the display processing section 53 superimposes and displays a message 311 indicating that the load is not set on the video on the display 94 in step S7 (FIG. 6). At this time, the display processing section 53 also displays a selection menu 312 for selecting, by the visual line, whether or not to newly set the load information. In FIG. 6, a reference numeral 202 denotes a display screen on the display 94 in which the message 311 and the selection menu 312 are superimposed on a video including the robot 10. Here, when the wearer selects "YES" on the selection menu 312 by the wearer's visual line, the display processing section 53 may further display a user interface screen for inputting the load setting value.

Figure 7:
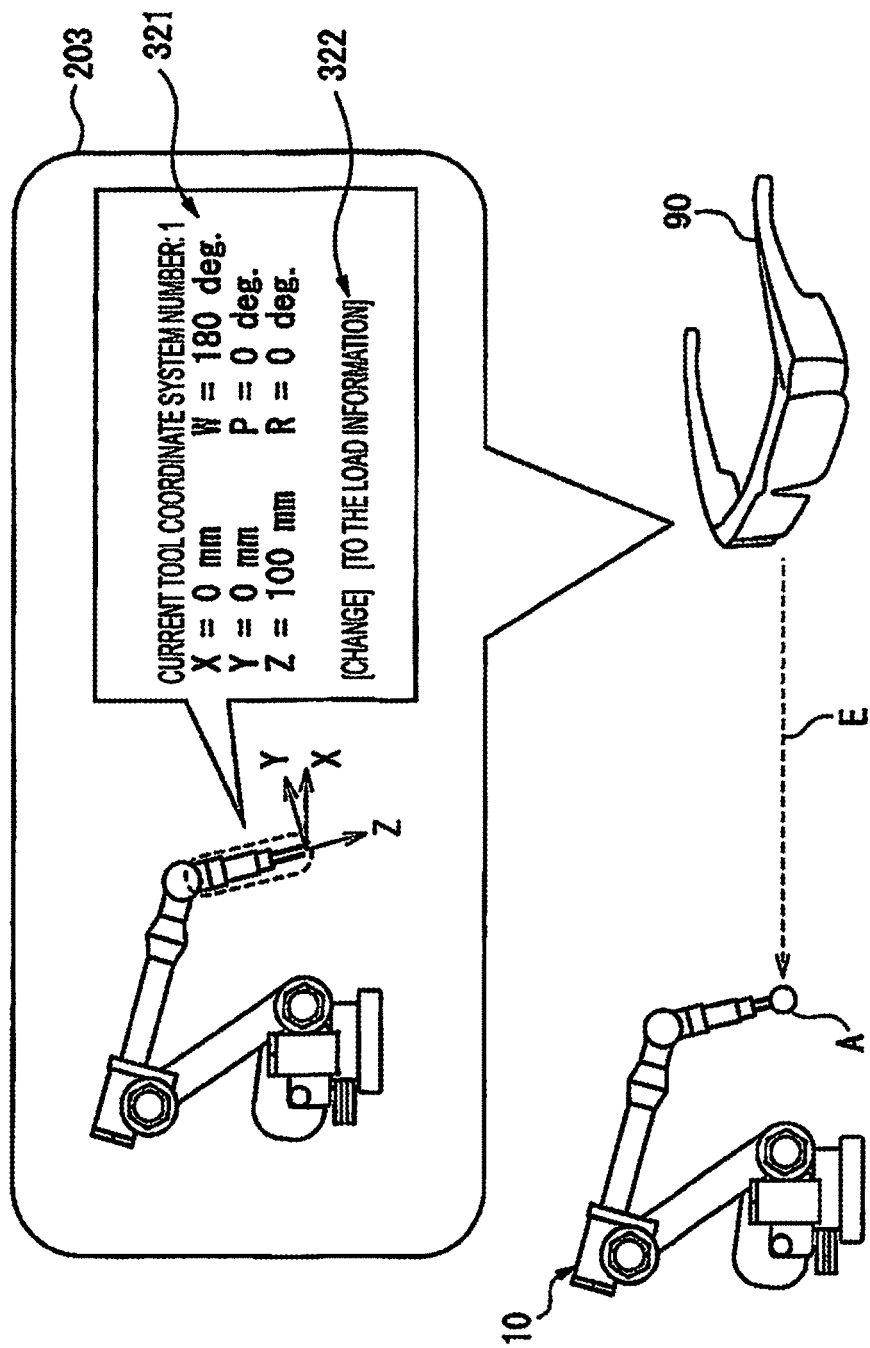
FIG. 7 is an example of a display screen in which information relating to tool coordinates is superimposed on the display screen.

When the tool coordinate system is set (S4: YES) and the load is also set (S5: YES), the display processing section 53 superimposes and displays a current setting value 321 of the tool coordinate system or the load information on the video on the display 94 in step S6 (FIG. 7). In FIG. 7, a reference numeral 203 denotes a display screen on the display 94 in which the setting values 321 of the tool coordinate system are superimposed and displayed on a video including the robot 10. The display screen 203 also displays a selection menu 322 for instructing transition to processing for changing setting values or displaying of load information. Here, when the wearer selects "CHANGE" on the selection menu 322 by the wearer's visual line, the process shifts to a tool coordinate system setting process described later. When the wearer selects "TO THE LOAD INFORMATION" on the selection menu 322 by the visual line, the setting value of the load information is displayed instead of the setting value of the tool coordinate system. In the display image of the setting value of the load information, a menu for shifting to a screen for changing the setting value of the load information is displayed.

Figure 8:
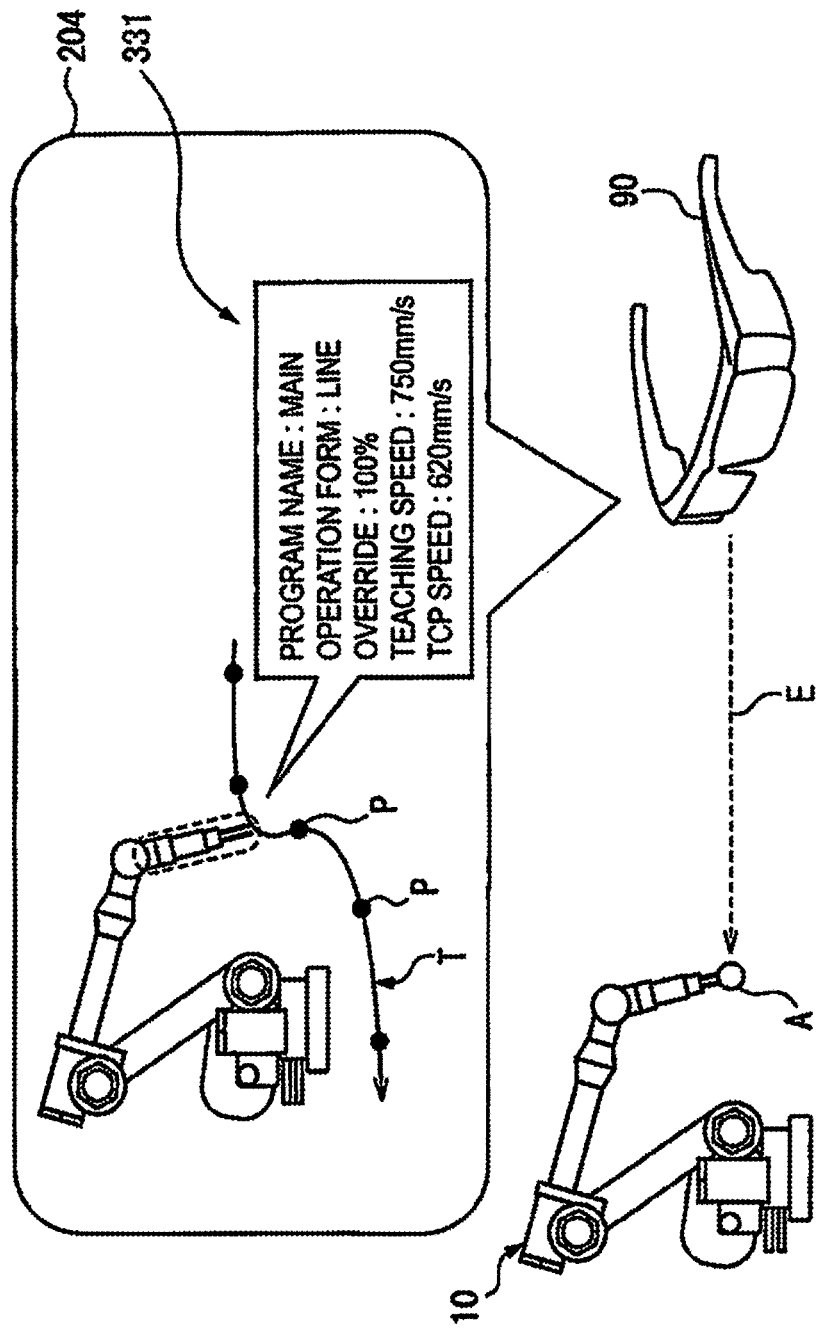
FIG. 8 is an example of a display screen in which information relating to the speed and trajectory of the robot is superimposed on a video.

When it is determined in step S3 that the robot 10 is in operation (S3: NO), the display processing section 53 causes the video display device 90 to display an image that enables the wearer to visually grasp the operation information of the robot 10 that moves the tool 12. Specifically, when the robot 10 is in operation (S3: NO) and the robot 10 is executing an operation program (S9: YES), the display processing section 53 superimposes and displays information relating to the speed and the trajectory of the robot 10 on a video in step S10 (FIG. 8). In FIG. 8, a reference numeral 204 denotes a display screen on the display 94 in which information 331 relating to the speed and trajectory of the robot 10 is superimposed and displayed on a video including the robot 10. On the display screen 204, character information indicating a name of the operation program, the operation form of the robot 10, the speed override, the teaching speed, and the tool center point speed (TCP speed) is superimposed and displayed, and an operation trajectory T and teaching points P of the tool tip are superimposed and displayed graphically.

Figure 9:
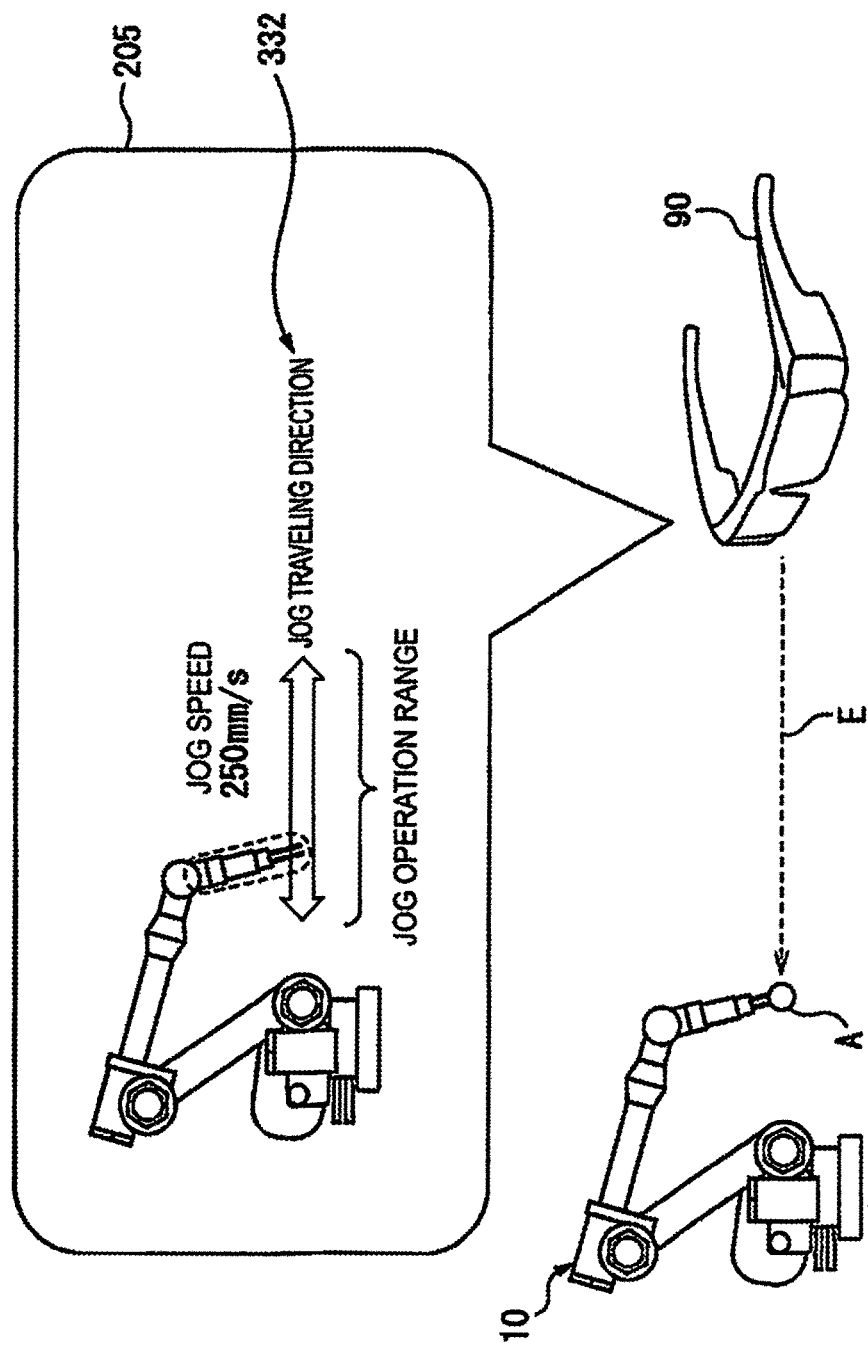
FIG. 9 is an example of a display screen in which information relating to the jog operation is superimposed on a video.

When the robot 10 is in operation (S3: NO) and the robot 10 is not executing an operation program (S9: NO), the robot controller 50 determines that the robot 10 is executing the operation by a jog operation using a teach pendant (not illustrated) connected to the robot controller 50. In this case, in step S11, the display processing section 53 superimposes and displays information 332 relating to the jog operation on the video (FIG. 9). In FIG. 9, a reference numeral 205 denotes a display screen on the display 94 in which the operation speed, the operation range, and the traveling direction of the robot 10 by the jog operation are superimposed and displayed as characters and images on a video including the robot 10.

Figure 10:
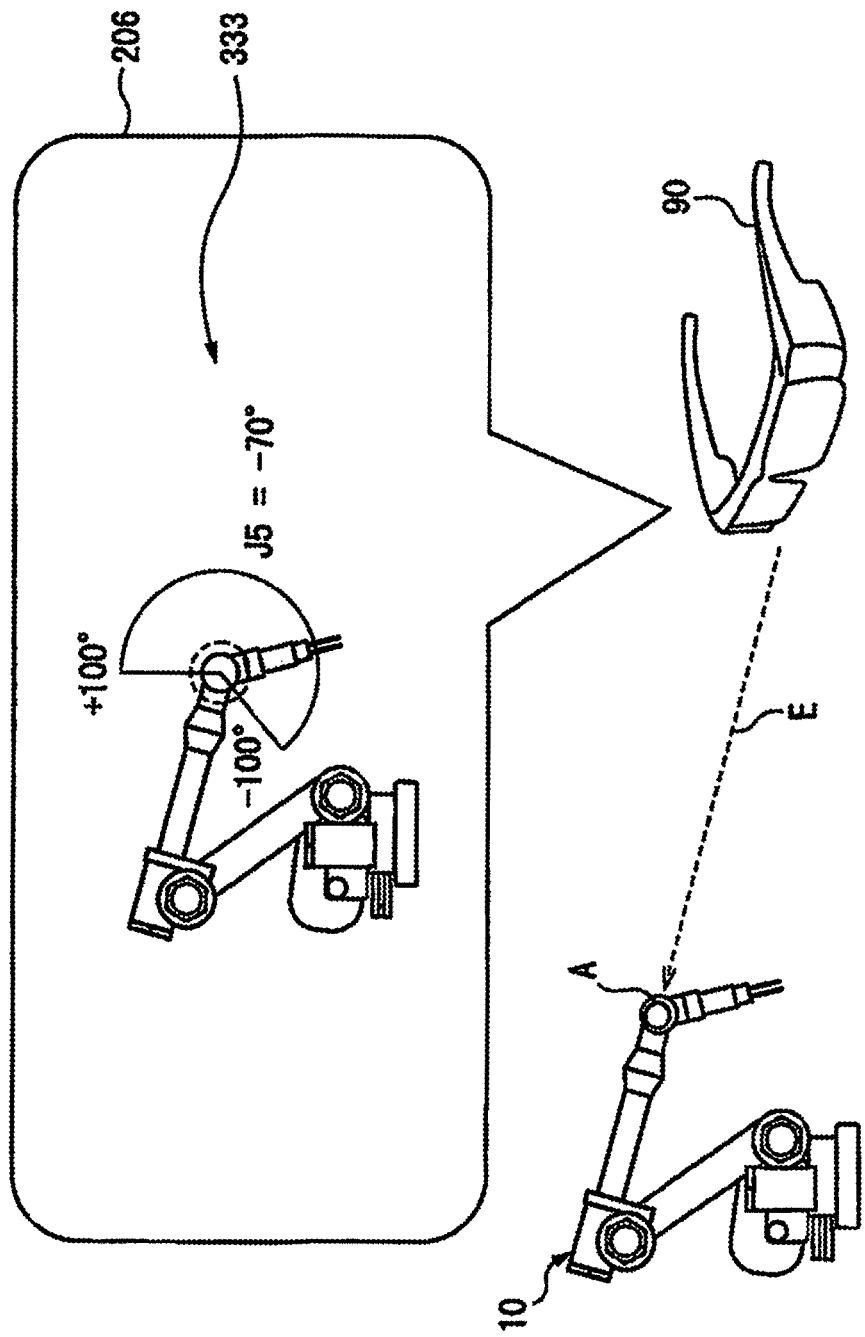
FIG. 10 is an example of a display screen in which information relating to a current position and a movable range of a joint is superimposed on a video.

When the gaze target of the wearer is a joint portion of the robot 10 (S2: NO, S12: YES), the display processing section 53 superimposes and displays information 333 relating to the current position of the joint portion and the movable range of the joint portion on the image in step 13 (FIG. 10). Here, it is assumed that the gaze point A of the wearer's visual line E is located at the 5th joint position (J5). In FIG. 10, a reference numeral 206 denotes a display screen on the display 94 in which information relating to the current position and the movable range of the 5th joint portion is superimposed and displayed as characters and images on a video including the robot 10.

Figure 11:
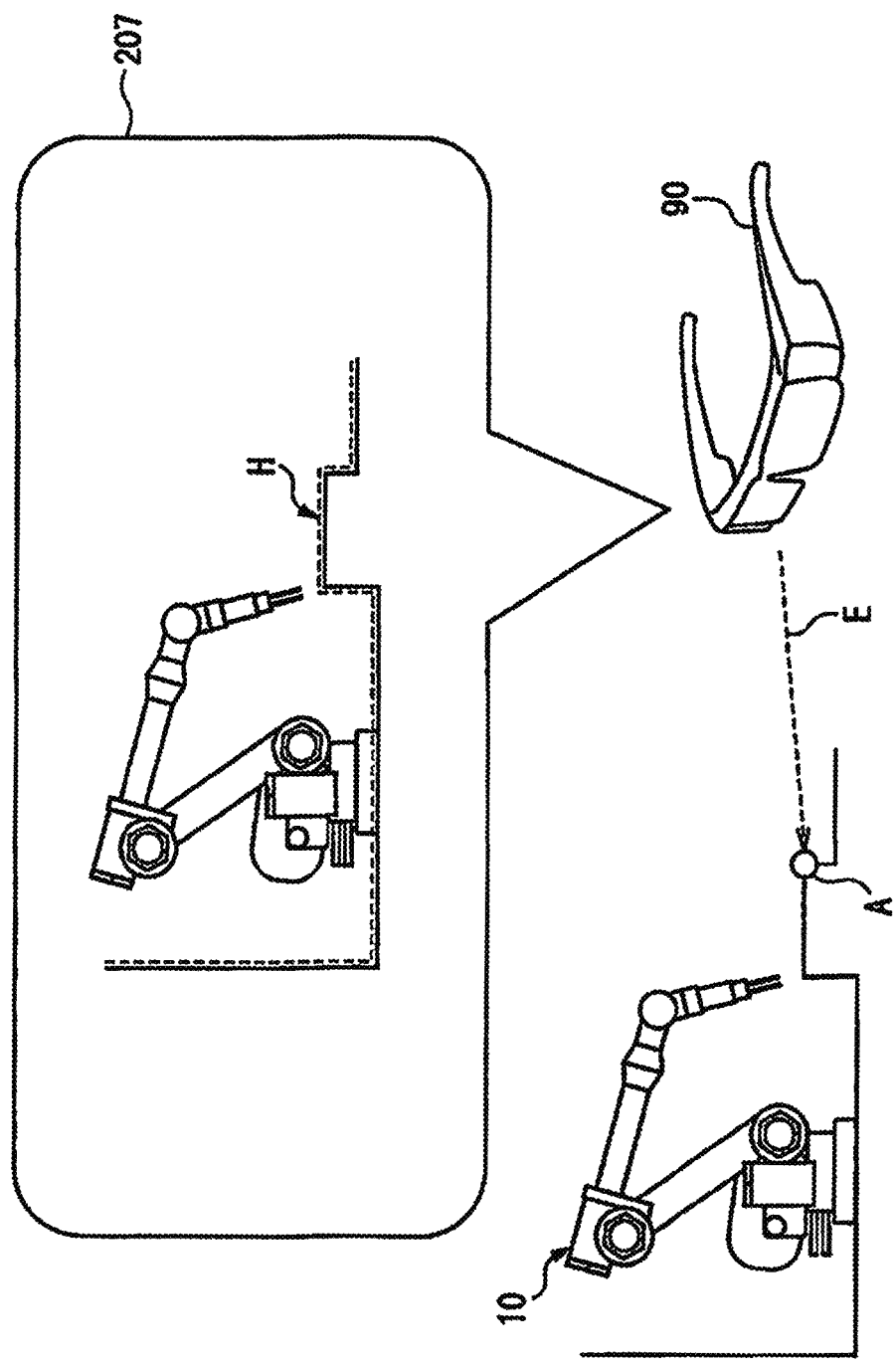
FIG. 11 is an example of a display screen in which information relating to an entry prohibited area is superimposed on a video.

In order for an industrial robot to avoid interference with the environment surrounding the robot, an area in which the robot cannot enter may be defined, and the robot may have a function of stopping when the robot tries to enter the area. Hereinafter, such an area is referred to as an "entry prohibited area". Information relating to the position of the entry prohibited area is stored in the information storage section 80 of the robot controller 50, for example, as the position on a base coordinate system of the robot 10. In step S14, when the gaze point A of the wearer is not the robot 10 but the surrounding environment of the robot 10 (S12: NO, S14: YES), the display processing section 53 superimposes and displays the information relating to the entry prohibited area on the video in the case where the entry prohibited area is defined in the surrounding area (Step S15; FIG. 11). In FIG. 11, a reference numeral 207 denotes a display screen on the display 94 in which a broken line H representing an entry prohibited area is superimposed and displayed as an image on a video including the robot 10.

Figure 12:
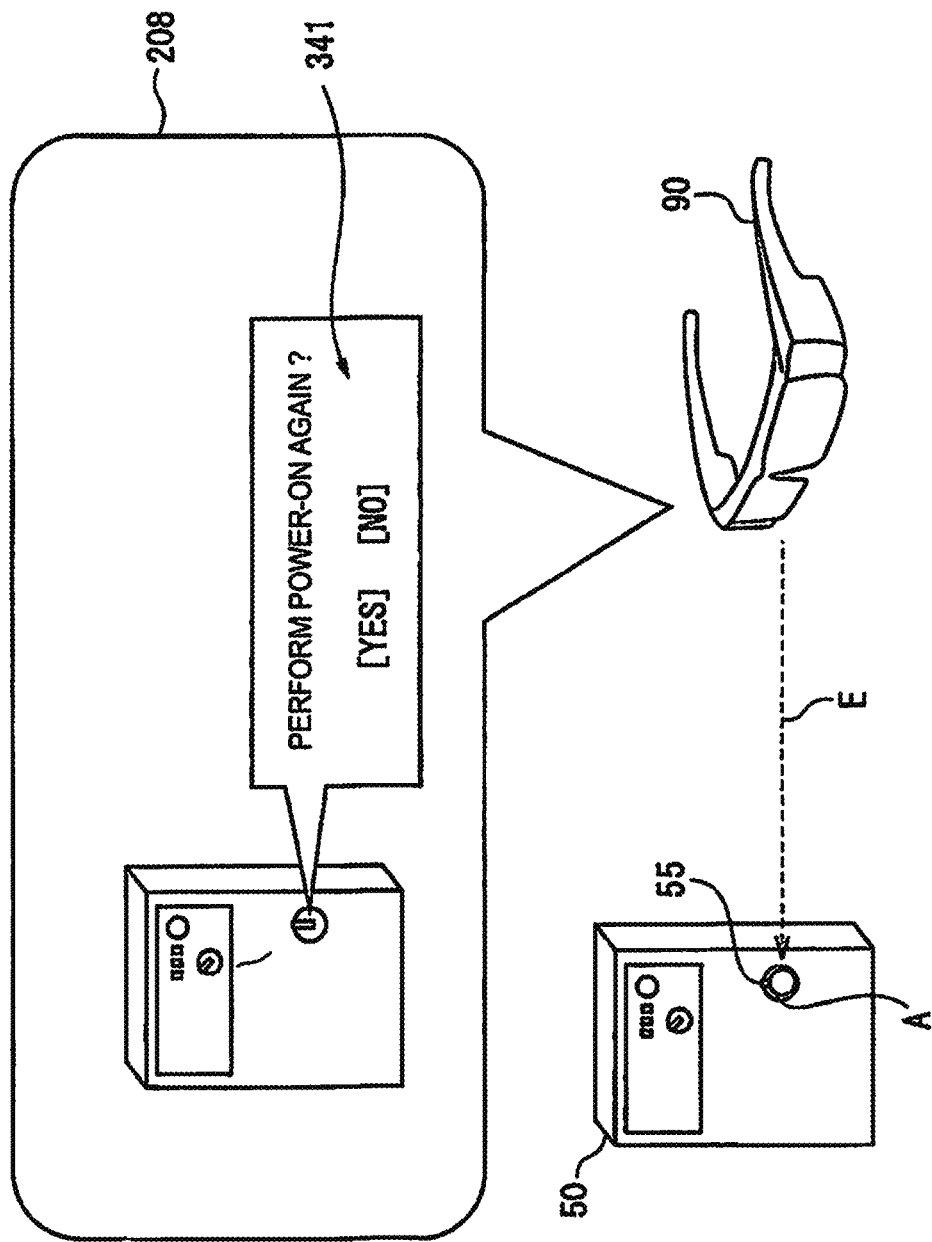
FIG. 12 is an example of a display screen in which a selection menu for performing power-on again is superimposed on a video.

In steps S16 to S21, when the gaze target identification section 51 identifies a selection switch provided on the robot controller 50 as the gaze target, the display processing section 53 causes the video display device 90 to display an image enabling the wearer to visually select the selection switch. Specifically, when the gaze target of the wearer is the robot controller 50 (S16: YES) and the robot 10 is stopped (S17: YES), it is further determined at which portion of the robot controller 50 the gaze point A of the wearer is (steps S18 and S20). When the gaze point A by the wearer's visual line E is near a power switch 55 and it is determined that the feature portion of the gaze target is the power switch 55 (S18: YES), the display processing section 53 superimposes and displays, on the video, a selection menu 341 for selecting whether or not to perform power-on again in step S19 (FIG. 12). In FIG. 12, a reference numeral 208 denotes a display screen on the display 94 in which the selection menu 341 is superimposed and displayed as character information on the video including the robot controller 50. When the wearer selects "YES" on the selection menu 341 by the visual line, the robot controller 50 performs power-on again of the robot 10.

Figure 13:
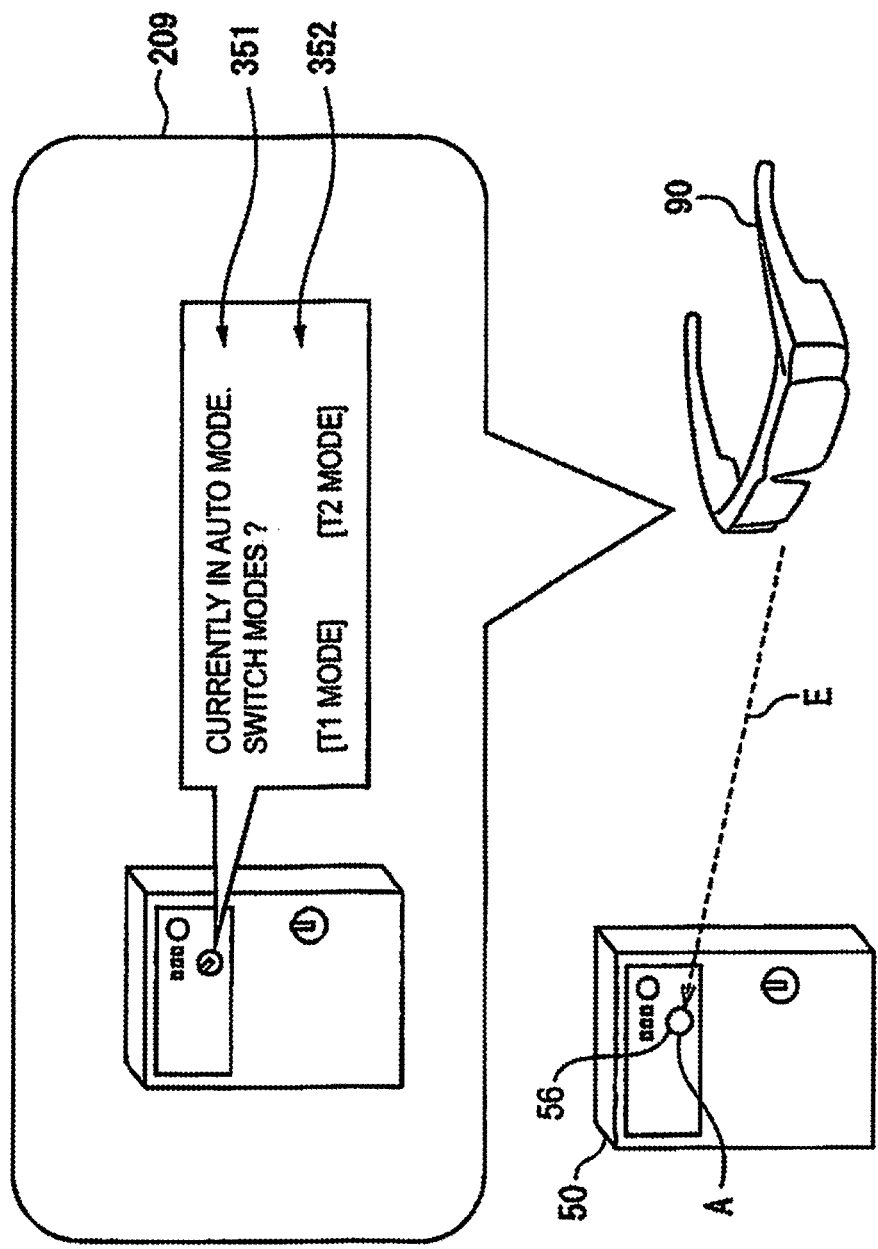
FIG. 13 is an example of a display screen in which a selection menu for switching the operation mode is superimposed on a video.

When the gaze point A of the wearer's visual line E is near a mode selection switch 56 and it is determined that the feature portion of the gaze target is the mode selection switch 56 (S18: NO, S20: YES), the display processing section 53 superimposes and displays a message 351 indicating the current operation mode of the robot controller 50 and a selection menu 352 for switching the operation mode on a video in step S21 (FIG. 13). In FIG. 13, a reference numeral 209 denotes a display screen on the display 94 in which the message 351 and the selection menu 352 are superimposed and displayed as character information on the video including the robot controller 50. When the wearer selects either the T1 mode or the T2 mode by the visual line, the robot controller 50 switches the operation mode to the selected mode.

Figure 14:
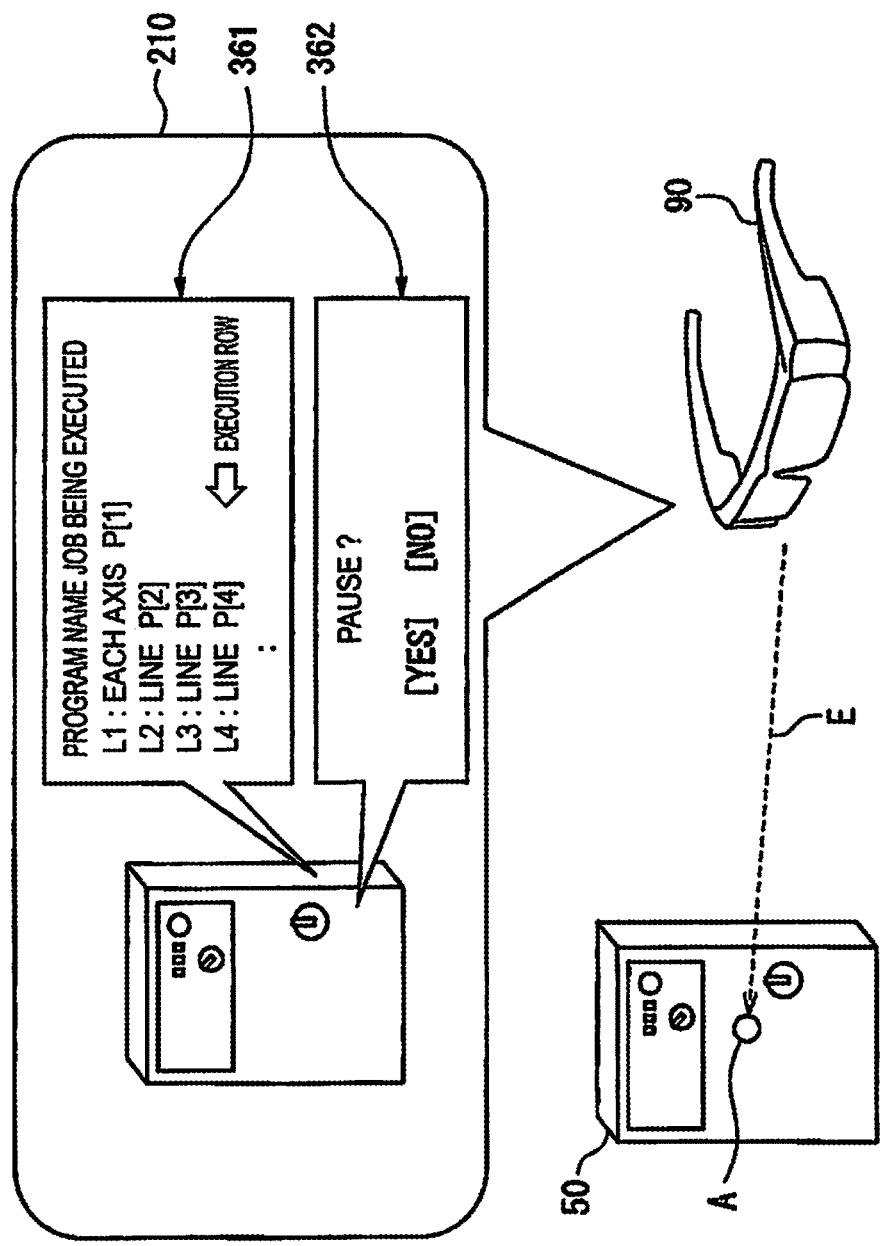
FIG. 14 is an example of a display screen in which information relating to an operation state of an operation program is superimposed on a video.

When the wearer watches an arbitrary point on the robot controller 50 (S16: YES) and the robot 10 is not stopped (S17: NO), it is determined that the operation program is being executed (S22: YES), and the display processing section 53 superimposes and displays information 361 indicating the execution state of the operation program and a selection menu 362 for selecting the pause or resume of the program on a video (Step S23; FIG. 14). In FIG. 14, a reference numeral 210 denotes a display screen on the display 94 in which information 361 indicating the state of the operation program and the selection menu 362 are superimposed and displayed as character information on the video including the robot controller 50. When the wearer selects "YES" by the visual line on the selection menu 362, the robot controller 50 pauses the operation program.

Figure 15:
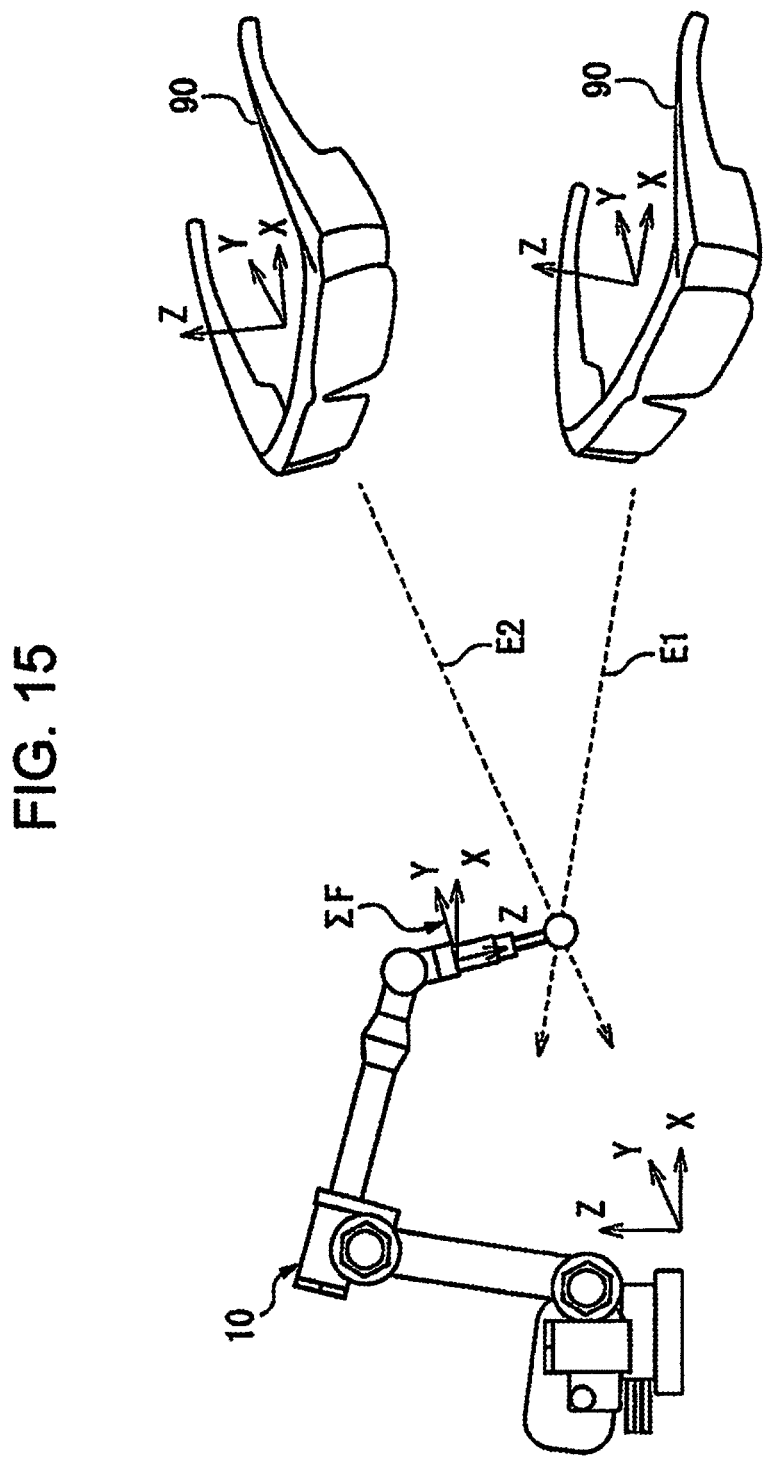
FIG. 15 is a diagram for explaining a tool coordinate system setting process.

Next, a tool coordinate system setting process executed when "YES" of the selection menu 302 is selected in step S8 (FIG. 4) or "CHANGE" of the selection menu 322 is selected in step S6 (FIG. 7) will be described with reference to FIGS. 15 to 16. The tool coordinate system setting process is executed by the tool coordinate system setting section 54 included in the robot controller 50. Here, the tool coordinate system setting process is a process of setting a tool coordinate system having a predetermined relationship with the flange coordinate system of the arm tip of the robot 10. As illustrated in FIG. 15, the position of the tool tip is estimated by the intersection of visual lines of the wearer defined when the tool tip is viewed in a plurality of directions. As an example, as illustrated in FIG. 15, the wearer is made to observe the tool tip from 2 positions, and the position of the tool tip is obtained by the intersection of the two visual line directions E1 and E2 at that time.

Figure 16:
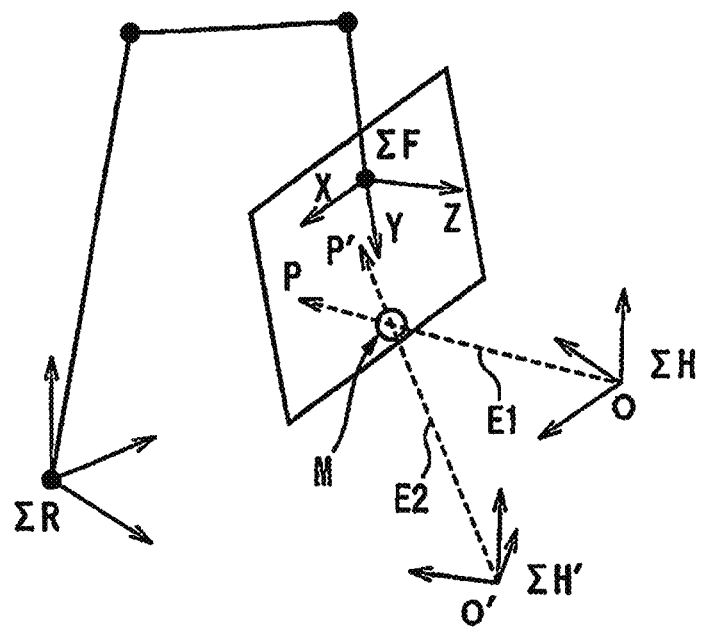
FIG. 16 is a diagram for explaining the tool coordinate system setting process.

FIG. 16 is a diagram for explaining a specific method of obtaining the tool tip position. The flange coordinate system is defined as $\Sigma F$, and the base coordinate system of the robot 10 is defined as ER. The relationship between $\Sigma F$ and $\Sigma R$ is known from the current position of the robot 10. Here, the coordinates (x, y, z) of the tool tip on the flange coordinate system $\Sigma F$ will be obtained. The head coordinate systems that represent positions and postures of the head when the wearer watches the tool tip from two different positions are defined as $\Sigma H$ and $\Sigma H'$, respectively. The $\Sigma H$ and $\Sigma H'$ may be a coordinate system fixed to the video display device 90. The head coordinate systems $\Sigma H$ and $\Sigma H'$ can be obtained by using various position detection methods known in the art, such as a position detection method by using an acceleration sensor and a gyro sensor mounted on the video display device 90, or a method for measuring by using an AR marker. Thus, the conversion between $\Sigma R$, $\Sigma F$, $\Sigma H$, and $\Sigma H'$ is known. Next, the starting points of the two visual line directions E1 and E2 measured by the visual line tracking section 92 are set to the origins of $\Sigma H$ and $\Sigma H'$ respectively, and intersections of the visual line directions E1 and E2 with an arbitrary plane (e.g., the XY plane) defined on the flange coordinate system $\Sigma F$ are defined as points P and P' respectively. In this case, the coordinate (x, y, z) of the tool tip can be obtained as the point of intersection M between the line segment OP and the line segment O'P' or as the point where the distance between the line segment OP and the line segment O'P' is minimized. Thus, a tool coordinate system having a predetermined relationship with the flange coordinate system can be set. For example, the origin of the tool coordinate system may be set to the tool tip.

After steps S6 to S8, S10, S11, S13, S15, S19, S20 (NO), S21, and S23, the information display processing ends. After these steps, the process may be returned to step S1 to continue the process.

As described above, according to the above embodiments, the user can grasp, select, or set information relating to a portion of interest for each object only by looking at the portion of interest. That is, according to the above embodiments, the user can access the desired information more efficiently.

While the disclosure has been described with reference to specific embodiments, it will be understood, by those skilled in the art, that various changes or modifications may be made thereto without departing from the scope of the following claims.

In the embodiment described above, the video display device 90 has a so-called closed type configuration including the display 94 configured to display video acquired by the video acquisition device 91, but the video display device 90 may have a configuration including transmissive type display. The transmissive type display is constituted by a half mirror, and the information regarding the gaze target provided from the robot controller 50 is synthesized and displayed in the field of view of the wearer wearing the display.

When the video display device 90 has a configuration including a transmissive type display, the video acquisition device 91 may be connected to the robot controller 50 as a device separately provided from the video display device 90. In such a configuration, the video display device 90 is provided with a sensor (acceleration sensor, gyro sensor, etc.) configured to detect the position and posture of the head of the wearer. The positions of the objects in the work space are known. In this case, the gaze target identification section obtains a visual line vector of the wearer toward a target object by grasping the relative position between the video display device 90 and the target object such as the robot 10, the posture of the wearer's head, and the visual line information (eye direction), and identifies the gaze target in the video acquired by the video acquisition device. The position of the target object in the video acquired by the video acquisition device may be identified by using image recognition processing, a relative positional relationship between the video acquisition device and the target object, or the like.

The arrangement of the functional blocks illustrated in FIG. 2 is an example, and the distribution of the functions to the robot controller 50 and the video display device 90 is not limited to the example illustrated in FIG. 2. For example, the robot controller 50 may be provided with the image processing section 93 configured to perform image processing for superimposing various kinds of information side by side with the gaze target in a video. In this case, a video signal on which various information is superimposed is transmitted from the robot controller 50 to the video display device 90. The feature identification section 52 may be provided in the video display device 90. In this case, the feature identification section 52 uses an object model acquired from the side of the robot controller 50 or retained in the feature identification section 52 to identify at which feature portion on the object the gaze point in the video is located.

When the gaze target identification section 51 identifies a gaze target portion on an object, the gaze target identification section 51 may set a predetermined range including the gaze point of the wearer as the gaze range and identify a portion included in the gaze range as the gaze target portion. In this case, for example, when the wearer looks at the vicinity of the tool of the robot, the tool is identified as the gaze target portion, thereby improving the user convenience. Further, the robot controller may be configured to allow a user to set the gaze range.

The program for executing the information display processing illustrated in FIG. 3 can be recorded on various recording media (e.g., a semiconductor memory such as a ROM, an EEPROM and a flash memory, a magnetic recording medium, and an optical disk such as a CD-ROM and a DVD-ROM) readable by a computer.

The invention claimed is:

1. A robot system comprising:
   a robot;
   a robot controller configured to control the robot;
   a video acquisition device configured to acquire a real video of a work space including the robot and the robot controller; and
   a head-mounted type video display device provided with
      a visual line tracking section configured to acquire visual line information of a wearer, wherein
   the robot controller including:
      an information storage section configured to store information used for controlling the robot while associating the information with a type of an object existing in the work space;
      a gaze target identification section configured to identify, in the video, a gaze target viewed by a wearer of the video display device in the work space, based on the visual line information; and
      a display processing section configured to cause the video display device to display the information associated with the object corresponding to the identified gaze target, side by side with the gaze target in a form of one image through which the wearer can visually grasp, select, or set contents of the information,
   wherein in response to the gaze target identification section identifying a tool attached to the robot as the gaze target, depending on whether or not a tool coordinate system of the tool is already-set, the display processing section is configured to cause the video display device to display the image that allows the wearer to visually perform at least one of grasping a setting state of the tool coordinate system, new setting or changing setting of the tool coordinate system.

2. The robot system according to claim 1, wherein
   the information storage section is configured to store the information specific to a feature portion predetermined for the object in association with the feature portion, and
   the display processing section is configured to cause the video display device to display the information associated with the feature portion corresponding to the gaze target.

3. The robot system according to claim 2, wherein the robot controller or the video display device includes a feature identification section configured to identify the feature portion by using an object model that models the object, the video, and the visual line information.

4. A robot system comprising:
   a robot;
   a robot controller configured to control the robot;
   a video acquisition device configured to acquire a real video of a work space including the robot and the robot controller; and
   a head-mounted type video display device provided with
      a visual line tracking section configured to acquire visual line information of a wearer, wherein
   the robot controller including:
      an information storage section configured to store information used for controlling the robot while associating the information with a type of an object existing in the work space;
      a gaze target identification section configured to identify, in the video, a gaze target viewed by a wearer of the video display device in the work space, based on the visual line information; and
      a display processing section configured to cause the video display device to display the information associated with the object corresponding to the identified gaze target, side by side with the gaze target in a form of one image through which the wearer can visually grasp, select, or set contents of the information,
   wherein when the gaze target identification section identifies a tool attached to a wrist flange of the robot as the gaze target, depending on whether or not a tool coordinate system of the tool is already-set and whether or not a load corresponding to the tool is set, the display processing section is configured to cause the video display device to display the image that allows the wearer to visually perform at least one of grasping a setting state of the tool coordinate system, new setting or changing setting of the tool coordinate system, grasping a setting state of the load, and new setting or changing setting of the load.

5. The robot system according to claim 1, wherein
   the tool is attached to a wrist flange of the robot, and
   in response to the gaze target identification section identifying the tool attached to the wrist flange of the robot as the gaze target, the display processing section is configured to cause the video display device to display the image that allows the wearer to visually perform grasping operation information of the robot that moves the tool.

6. The robot system according to claim 4, further comprising a tool coordinate system setting section configured to set the tool coordinate system, based on a first visual line information obtained when the wearer with its head placed in a first position and posture views the tool, a second visual line information obtained when the wearer with its head placed in a second position and posture different from the first position and posture views the tool, a base coordinate system of the robot, a flange coordinate system of the robot, a relative relationship between the base coordinate system and the first position and posture of the head, and a relative relationship between the base coordinate system and the second position and posture of the head.

7. The robot system according to claim 1, wherein when the gaze target identification section identifies a joint portion of the robot as the gaze target, the display processing section is configured to cause the video display device to display the image that allows the wearer to visually perform at least one of grasping an axial position of the joint portion and grasping a movable range of the joint portion.

8. The robot system according to claim 1, wherein when the gaze target identification section identifies a predetermined area of a surrounding environment including an entry prohibited area of the robot as the gaze target, the display processing section is configured to cause the video display device to display the image that allows the wearer to visually perform grasping the entry prohibited area.

9. The robot system according to claim 1, wherein when the gaze target identification section identifies a selection switch provided on the robot controller as the gaze target, the display processing section is configured to cause the video display device to display the image that allows the wearer to visually perform selecting the selection switch.

10. The robot system according to claim 1, wherein when the gaze target identification section identifies an arbitrary point on the robot controller as the gaze target, the display processing section is configured to cause the video display device to display the image that allows the wearer to visually perform at least one of grasping an execution state of an operation program of the robot and selecting execution of the operation program.

11. The robot system according to claim 1, wherein the robot controller is configured to cause the display processing section to perform display processing of the image depending on whether or not the robot is stopped.

12. The robot system according to claim 1, wherein the robot controller or the video display device includes an image processing section configured to image the information into the form of the one image.

13. The robot system according to claim 1, wherein the video display device includes a display configured to display the video acquired by the video acquisition device, together with the information, and the gaze target identification section is configured to identify the gaze target viewed by the wearer as the video on the display.

14. The robot system according to claim 1, wherein the video display device includes a transmissive type display configured to display the information, and the gaze target identification section is configured to identify the gaze target in real-world that the wearer is viewing through the transmissive display.

15. The robot system according to claim 1, wherein the video acquisition device is mounted on the video display device or provided separately from the video display device.

* * * * *